US009988508B2

(12) United States Patent
Ishimoto et al.

(10) Patent No.: US 9,988,508 B2
(45) Date of Patent: Jun. 5, 2018

(54) EPOXY-RESIN COMPOSITION AND FILM, PREPREG, AND FIBER-REINFORCED PLASTIC USING SAME

(71) Applicant: Mitsubishi Rayon Co., Ltd., Chiyoda-ku (JP)

(72) Inventors: Tomoko Ishimoto, Toyohashi (JP); Manabu Kaneko, Toyohashi (JP); Kenichi Watanabe, Toyohashi (JP); Yasuhiro Fukuhara, Toyohashi (JP); Sanae Kita, Toyohashi (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 304 days.

(21) Appl. No.: 14/409,249

(22) PCT Filed: Aug. 20, 2013

(86) PCT No.: PCT/JP2013/072173
§ 371 (c)(1),
(2) Date: Dec. 18, 2014

(87) PCT Pub. No.: WO2014/030638
PCT Pub. Date: Feb. 27, 2014

(65) Prior Publication Data
US 2015/0175760 A1 Jun. 25, 2015

(30) Foreign Application Priority Data
Aug. 20, 2012 (JP) ................................. 2012-181510

(51) Int. Cl.
C08J 5/24 (2006.01)
D06M 15/55 (2006.01)
C08K 7/06 (2006.01)
C08L 53/00 (2006.01)
C08L 63/00 (2006.01)
C08J 5/18 (2006.01)
C08G 59/22 (2006.01)
C08G 59/26 (2006.01)
C08G 59/24 (2006.01)
C08G 59/40 (2006.01)

(52) U.S. Cl.
CPC .............. C08J 5/24 (2013.01); C08G 59/226 (2013.01); C08G 59/245 (2013.01); C08G 59/26 (2013.01); C08G 59/4021 (2013.01); C08J 5/18 (2013.01); C08K 7/06 (2013.01); C08L 53/00 (2013.01); C08L 63/00 (2013.01); D06M 15/55 (2013.01); C08J 2363/00 (2013.01); C08J 2453/00 (2013.01); C08J 2463/00 (2013.01); C08L 2205/02 (2013.01); Y10T 442/20 (2015.04)

(58) Field of Classification Search
CPC .......... C08L 53/00; C08L 63/00; C08L 33/12; C08G 59/4021; C08G 59/226; C08J 5/18; C08J 5/24; C08J 2363/00; C08J 2463/00; D06M 15/55; Y10T 442/20
USPC .......................................................... 442/59
See application file for complete search history.

(56) References Cited

U.S. PATENT DOCUMENTS

| 2004/0034124 | A1 | 2/2004 | Court et al. |
| 2006/0035088 | A1 | 2/2006 | Takano et al. |
| 2009/0198012 | A1 | 8/2009 | Sakata et al. |
| 2010/0209642 | A1 | 8/2010 | Tomioka et al. |
| 2011/0184091 | A1 | 7/2011 | Mizuki et al. |
| 2012/0108132 | A1 | 5/2012 | Fang et al. |
| 2012/0202071 | A1 | 8/2012 | Kaneko et al. |

FOREIGN PATENT DOCUMENTS

| EP | 2 447 307 A2 | 5/2012 |
| EP | 2 484 715 A1 | 8/2012 |
| JP | 8 337707 | 12/1996 |
| JP | 9 194611 | 7/1997 |
| JP | 11 5887 | 1/1999 |
| JP | 2003 535181 | 11/2003 |
| JP | 2010 100834 | 5/2010 |
| JP | 2010 229212 | 10/2010 |
| RU | 2 389 743 C2 | 5/2010 |
| WO | 2004 048435 | 6/2004 |
| WO | WO 2006/052730 A1 | 5/2006 |

(Continued)

OTHER PUBLICATIONS

Mitsubishi Chemical, jER Epoxy catalogue, accessed online Oct. 27, 2016.*
Emerald Performance Materials, CVC Thermoset Specialties, Omicure U-52 material data sheet, accessed online May 5, 2017.*
Extended European Search Report dated Aug. 5, 2015 in the corresponding European Application No. 13831159.2.
Combine Russian Office Action and Search Report dated Apr. 22, 2016 in Patent Application No. 2015100262/04(000502) (with English language translation).

(Continued)

Primary Examiner — Camie S Thompson
(74) Attorney, Agent, or Firm — Oblon, McClelland, Maier & Neustadt, L.L.P.

(57) ABSTRACT

An epoxy-resin composition of the components (A), (B), (D) and (E), where component (A) is an epoxy resin having an oxazolidone-ring structure, (B) is a bisphenol bifunctional epoxy resin with a number-average molecular weight of at least 600 but no more than 1300, which does not have an oxazolidone-ring structure, (D) is a triblock copolymer, and (E) is a curing agent. A film made of the epoxy-resin composition, a prepreg and a fiber-reinforced plastic is also disclosed. The epoxy resin composition is capable of achieving both a processability of a prepreg at room temperature and a suppression of voids in the molded product. A fiber-reinforced plastic having excellent mechanical properties, especially excellent fracture toughness and heat tolerance, is also obtained by using the epoxy-resin composition.

17 Claims, No Drawings

(56) References Cited

FOREIGN PATENT DOCUMENTS

| WO | 2008 001705 | | 1/2008 |
|---|---|---|---|
| WO | 2008 143044 | | 11/2008 |
| WO | WO2012-043453 | * | 4/2012 |

OTHER PUBLICATIONS

International Search Report dated Oct. 8, 2013 in PCT/JP13/072173 Filed Aug. 20, 2013.

* cited by examiner

EPOXY-RESIN COMPOSITION AND FILM, PREPREG, AND FIBER-REINFORCED PLASTIC USING SAME

FIELD OF THE INVENTION

The present invention relates to epoxy-resin compositions preferred to be used in fiber-reinforced plastics for sports/leisure applications, industrial applications and the like. The present invention also relates to film, prepreg and fiber-reinforced plastics produced by using such epoxy-resin compositions.

The present application is based upon and claims the benefit of priority to Japanese Patent Application No. 2012-181510, filed on Aug. 20, 2012. The entire contents of the application are incorporated herein by reference.

BACKGROUND ART

Because of their light weight, high strength and rigidity, fiber-reinforced plastics are widely used as fiber-reinforced composite materials in products ranging from sports/leisure applications to industrial applications such as automobiles and aircraft.

Among fiber-reinforced plastics, fiber-reinforced plastic tubes are especially widely used in sports/leisure applications such as fishing rods, golf club shafts, ski poles, bicycle frames and so on. In recent years, improving the fracture toughness of fiber-reinforced plastics in sports/leisure applications has been required to enhance feel during usage or feel when hitting a ball.

A method for producing fiber-reinforced plastics is, for example, using intermediate material (prepreg) formed by impregnating a matrix resin into reinforcing material made of reinforcing fibers such as long fibers. Such a method is useful because the content of reinforcing fibers is easier to control in a fiber-reinforced plastic and because a plastic is designed to have a greater amount of reinforcing fibers.

Specific examples of a method for producing a fiber-reinforced plastic from a prepreg are molding using an autoclave, compression molding, internal-pressure molding, oven molding and the like. To cure a generic prepreg using such a method, it is usually necessary to thermoset the prepreg by applying heat for approximately two hours. Considering the time for heating or cooling the equipment or a molding die or the like to be used for curing, it takes approximately 2~6 hours, depending on conditions, to cure a prepreg in one molding process. Accordingly, the time taken for thermosetting is one factor that increases the cost of molding. In addition, a method has been sought for molding a product at a lower temperature in a shorter period of time so as to achieve mass production.

As a method for shortening the molding time of fiber-reinforced plastics, it is an option to use a highly reactive epoxy-resin composition as a matrix resin so that curing reactions progress by a slight amount of energy, thereby shortening the time for curing the epoxy resin composition. However, if a resin composition is too highly reactive, curing reactions progress even when the composition is stored at room temperature, causing a decrease in the storage stability of the resin composition. Also, if the matrix resin composition cures too quickly, that may cause voids in a molded product produced using a method for molding in a short period of time. Especially, voids tend to remain in a molded product when oven molding (vacuum bag molding) is employed. Voids may be suppressed by lowering the viscosity of the matrix resin composition. However, a prepreg containing a low viscous matrix resin composition tends to be tacky at room temperature and is hard to handle during a production process.

Considering the problems above, epoxy-resin compositions are required to have the following features: properties for producing a molded product at low temperature in a short period of time; processability of a prepreg at room temperature and suppression of voids in a molded product; and excellent mechanical characteristics, especially excellent fracture toughness, when used as a matrix resin to produce fiber-reinforced plastics.

As an example of a prepreg capable of producing molded products at a relatively low temperature in a short period of time, patent publication 1 discloses a prepreg containing an epoxy-resin composition as a matrix resin, where dicyandiamide is used as a latent curing agent, and polyvinyl formal is used as a thermoplastic resin elastomer. Also, patent publication 2 discloses a prepreg formed by using an epoxy-resin composition containing a reaction product of an epoxy resin and an amine compound having a sulfur atom in the molecule.

In addition, to improve fraction toughness of a cured product, numerous methods are proposed using epoxy-resin compositions containing thermoplastic resins. For example, patent publications 3 and 4 each propose to use an epoxy-resin composition with an added polyamide-based thermoplastic elastomer. Also, patent publications 5 and 6 each propose to use an epoxy-resin composition with an added block copolymer.

PRIOR ART PUBLICATION

Patent Publication patent publication 1: JP H11-5887A
patent publication 2: WO2004/048435
patent publication 3: JP H08-337707A
patent publication 4: JP H09-194611A
patent publication 5: WO2008/001705
patent publication 6: JP2003-535181A

SUMMARY OF THE INVENTION

Problems to be Solved by the Invention

However, the curing time for the prepreg disclosed in patent publication 1 is still long, and the cured product does not exhibit enough fracture toughness.

The prepreg disclosed in patent publication 2 can be sufficiently cured at a low temperature, but further improvement in fracture toughness is sought for a cured product of the prepreg.

In addition, regarding the technologies described in patent publications 3, 4, 5 and 6, since the curing time for the matrix resin is long and a high curing temperature is necessary, the aforementioned requirements are not satisfied.

The present invention has been carried out in consideration of the above problems. Its objective is to provide an epoxy-resin composition capable of producing a prepreg that exhibits processability at room temperature and suppresses voids in a molded product. Another objective is to provide a fiber-reinforced plastic having excellent mechanical characteristics, especially excellent fracture toughness and heat tolerance.

Solutions to the Problems

The inventors of the present invention have studied intensively and found that epoxy-resin compositions with the following properties can produce a molded product at a lower temperature in a shorter period time than conventional epoxy-resin compositions. In addition, the inventors have found that a prepreg containing the epoxy-resin composition exhibits excellent processability at room temperature and suppresses voids in a molded product. Moreover, the inventors have found that fiber-reinforced plastics produced using the epoxy-resin composition exhibit excellent mechanical characteristics, especially excellent fracture toughness and heat tolerance.

Namely, the present invention relates to the following:

[1] An epoxy-resin composition containing components (A), (B), (D) and (E) below;
component (A): an epoxy resin having an oxazolidone-ring structure in the molecule
component (B): a bisphenol bifunctional epoxy resin with a number-average molecular weight of at least 600 but no more than 1300, which does not have an oxazolidone-ring structure in the molecule
component (D): a triblock copolymer
component (E): a curing agent

[2] The epoxy-resin composition described in [1] above, where the content of component (A) in the epoxy resin composition is 3~45 mass % of the total mass of the epoxy resin in the epoxy-resin composition;

[3] The epoxy-resin composition described in [1] or [2] above, where component (D) is a triblock copolymer of poly(methyl methacrylate)/poly(butyl acrylate)/poly(methyl methacrylate);

[4] The epoxy-resin composition described in any of [1]~[3] above, where component (D) is a triblock copolymer copolymerized with dimethylacrylamide;

[5] The epoxy-resin composition described in [4] above, where the polymerization proportion of the dimethylacrylamide in the triblock copolymer copolymerized with dimethylacrylamide is 10~15 mass % in terms of the polymerization material with respect to the total mass of the triblock copolymer copolymerized with dimethylacrylamide;

[6] The epoxy-resin composition described in any of [1]~[5] above, where component (E) is dicyandiamide;

[7] The epoxy-resin composition described in any of [1]~[6] above, further containing component (F) below;
component (F): a urea-based curing aid

[8] The epoxy-resin composition described in any of [1]~[7] above, where component (B) is a bisphenol A epoxy resin;

[9] The epoxy-resin composition described in any of [1]~[8] above, further containing component (C) below;
component (C): an epoxy resin in a liquid state at 30° C.

[10] The epoxy-resin composition described in [9] above, where component (C) does not have an oxazolidone-ring structure in the molecule and its viscosity at 30° C. is 1000 Pa·s or lower;

[11] The epoxy-resin composition described in [10] above, where component (C) is a bisphenol bifunctional epoxy resin;

[12] The epoxy-resin composition described in any of [7]~[10] above, where component (F) is 3-phenyl-1,1-dimethylurea or toluene bis dimethyl urea;

[13] The epoxy-resin composition described in any of [1]~[12] above, where with respect to the total mass of epoxy resin in the epoxy-resin composition,
the content of component (A) is 3~45 mass %,
the content of component (B) is 55~97 mass %,
the total content of components (A) and (B) does not exceed 100 mass %,
the content of component (D) is 5~11 parts by mass based on 100 parts by mass of the epoxy resin in the epoxy-resin composition, and
component (E) is dicyandiamide and the content of dicyandiamide is 1~25 parts by mass based on 100 parts by mass of epoxy resin in the epoxy-resin composition;

[14] The epoxy-resin composition described in any of [9]~[12] above, where with respect to the total mass of epoxy resin in the epoxy-resin composition,
the content of component (A) is 3~45 mass %,
the content of component (B) is 8~50 mass %,
the content of component (C) is 20~60 mass %,
the total content of components (A), (B) and (C) does not exceed 100 mass %,
the content of component (D) is 5~11 parts by mass based on 100 parts by mass of the epoxy resin in the epoxy-resin composition, and
component (E) is dicyandiamide and the content of dicyandiamide is 1~25 parts by mass based on 100 parts by mass of the epoxy resin in the epoxy-resin composition;

[15] The epoxy-resin composition described in [13] or [14] above, where component (E) is dicyandiamide, the content of component (E) in the epoxy-resin composition is set so that the molar number of active hydrogen in the dicyandiamide is 0.6~1.0 times the total molar number of the epoxy groups of the epoxy resin in the epoxy-resin composition;

[16] A film made of the epoxy-resin composition described in any of [1]~[15] above;

[17] A prepreg made by impregnating a reinforcing fiber material with the epoxy-resin composition described in any of [1]~[15] above; and

[18] A fiber-reinforced plastic made of reinforcing fiber and a cured product of the epoxy-resin composition described in any of [1]~[15] above.

Effects of the Invention

Using an epoxy-resin composition related to the present invention, processability of a prepreg at room temperature and suppression of voids in a molded product are both achieved. In addition, fiber-reinforced plastics having excellent mechanical properties, especially excellent fracture toughness and heat tolerance, are obtained by using the epoxy-resin composition. Namely, according to the embodiments of the present invention, an excellent epoxy-resin composition, a film and a prepreg made by using the epoxy-resin composition are provided. Furthermore, a fiber-reinforced plastic produced by using the prepreg is also provided.

DETAILED DESCRIPTION OF THE EMBODIMENTS

Embodiments to carry out the present invention are described in the following.

The term epoxy resin is referred to as a general category for a thermosetting resin, or as a chemical category for a compound having one or multiple 1,2-epoxy groups in the molecule. In the embodiments of the present invention, the latter definition is employed. Moreover, if a component contains one or multiple 1,2-epoxy groups in the molecule, not only a polymer having a specific polymerization degree but also a monomer will be included under the definition of an epoxy resin in embodiments of the present invention.

In the embodiments of the present invention, "molecular weight" indicates a number-average molecular weight unless otherwise specified.

In the present application, "~" includes the number, ratio or the like provided before and after "~".

<Epoxy-Resin Composition>

In the embodiments of the present invention, an epoxy-resin composition contains components (A), (B), (D) and (E). In the following, each component is described.

(Component (A): Epoxy Resin having an Oxazolidone-Ring Structure)

As component (A), the epoxy-resin composition related to the present invention contains an epoxy resin with an oxazolidone-ring structure in the molecule. When an epoxy-resin composition contains an epoxy resin having an oxazolidone-ring structure in the molecule, a prepreg made from the epoxy-resin composition exhibits excellent processability at room temperature, and the heat tolerance is enhanced for a cured product of the epoxy-resin composition.

In the present application, "room temperature" indicates a temperature range of 10~30° C.

An "epoxy-resin composition" in the embodiment of the present invention indicates a resin before being cured.

An oxazolidone-ring structure is produced through addition reactions of an isocyanate group and an epoxy group. Namely, by setting an excessive amount of epoxy resin (X) to react with isocyanate compound (Y), epoxy resin (component (A)) is obtained to have an oxazolidone-ring structure in the molecule. In the embodiments of the present invention, various types of isocyanate compound may be used as a raw material; however, to obtain an epoxy resin with a fused oxazolidone-ring structure, it is preferred to use an isocyanate compound having multiple isocyanate groups. In addition, for a cured product of an epoxy-resin compound containing the epoxy resin, namely, component (A), to have high heat tolerance, a diisocyanate with a rigid structure is preferred.

Examples of isocyanate compound (Y) are phenylene diisocyanate, toluylene diisocyanate, bis(isocyanatomethyl)benzene, diphenylmethane diisocyanate, bis(isocyanatomethyl)cyclohexane, hexamethylene diisocyanate and the like. Among those, phenylene diisocyanate, toluylene diisocyanate, bis(isocyanatomethyl)benzene and diphenylmethane diisocyanate are preferred because of their rigid structure when fused with a benzene ring. Toluylene diisocyanate is especially preferred from the viewpoint of economically easy availability.

Also, to produce epoxy resin (X) with an oxazolidone-ring structure, various types of epoxy resin may be used as a raw material. However, to efficiently obtain an epoxy resin with a fused oxazolidone-ring structure, the epoxy resin is preferred to have an epoxy group on each of both ends in the molecule. Preferred examples are bisphenol A epoxy resins, bisphenol F epoxy resins, biphenyl epoxy resins and the like. Among those, bisphenol A diglycidyl ether, bisphenol F diglycidyl ether, and biphenyl diglycidyl ether are especially preferred so as to prevent excessively high viscosity in the obtained epoxy resin having an oxazolidone-ring structure, namely, component (A).

A product of addition reactions, obtained by mixing and reacting 1 mol of toluylene diisocyanate as isocyanate compound (Y) with 2 mol of bisphenol A diglycidyl ether as epoxy resin (X), is especially preferred so as to achieve excellent processability of a prepreg at room temperature and excellent heat tolerance in a cured product of the epoxy-resin composition.

In an embodiment of the present invention, component (A) is preferred to be an epoxy resin having an oxazolidone-ring structure in the molecule obtained by reacting isocyanate compound (Y) and epoxy resin (X).

In addition, component (A) in another embodiment of the present invention is preferred to be an epoxy resin having an oxazolidone-ring structure in the molecule obtained by reacting at least one type of isocyanate compound (Y) selected from a group of phenylene diisocyanate, toluylene diisocyanate, bis(isocyanatomethyl)benzene, and diphenylmethane diisocyanate, and at least one type of epoxy resin (X) selected from a group of bisphenol A diglycidyl ether, bisphenol F diglycidyl ether, and biphenyl diglycidyl ether. Especially preferred is an epoxy resin having an oxazolidone-ring structure in the molecule obtained by reacting 1 mol of toluylene diisocyanate and 2 mol of bisphenol A diglycidyl ether.

Examples of a commercially available epoxy resin having an oxazolidone-ring structure (component (A)) are AER4152 and AER4151 (brand names, made by Asahi Kasei E-Materials Corporation), ACR1348 (brand name, made by ADEKA Corporation), DER852 (brand name, made by Dow Chemical Company) and the like. They are all preferred to be used in the present invention, but most preferred is AER4152.

As component (A), the above listed epoxy resins may be used in combination of two or more.

The content of component (A) in the epoxy-resin composition is preferred to be 1~45 parts by mass based on the total 100 parts by mass of all the epoxy resins in the epoxy-resin composition of the embodiment. The content of component (A) is preferred to be at least 1 part by mass, because a cured product of the epoxy-resin composition containing component (A) exhibits high heat tolerance and excellent mechanical characteristics. On the other hand, the content is preferred to be no more than 45 parts by mass to make it easier to obtain a molded product that exhibits high fracture toughness and contains no voids. The content of component (A) is more preferred to be 3~45 parts by mass and especially preferred to be 4~30 parts by mass. Namely, in an embodiment of the present invention, the content of component (A) in the epoxy-resin composition is preferred to be 1~45 mass %, more preferred to be 3~45 mass % and especially preferred to be 4~30 mass %, based on the total mass of epoxy resins in the epoxy-resin composition.

In the embodiments of the present invention, "heat tolerance of a cured product of the epoxy-resin composition" is evaluated by a glass transition temperature (G'-Tg) of the cured product obtained by curing the epoxy-resin composition of the embodiment.

(Component (B): Bisphenol Bifunctional Epoxy Resin Whose Number-Average Molecular Weight is at Least 600 but not more than 1300, and which does not have an Oxazolidone-Ring Structure in the Molecule).

In embodiments of the present invention, a "bifunctional epoxy resin" indicates a compound having two epoxy groups in the molecule. The same applies to a "trifunctional epoxy resin" or the like.

According to embodiments of the present invention, fracture toughness of the epoxy-resin composition is enhanced since it contains component (B).

Examples of component (B) are bisphenol A bifunctional epoxy resins, bisphenol F bifunctional epoxy resins, and the like. Two or more bisphenol bifunctional epoxy resins may be combined for use as component (B).

In the embodiments of the present invention, the number-average molecular weight of component (B) in the epoxy-resin composition is 600~1300. The number-average molecular weight of component (B) is preferred to be at least 600 because a cured product of the epoxy-resin composition containing such component (B) exhibits high fracture toughness, and processability at room temperature of a prepreg containing the epoxy resin composition is excellent. More preferably, the number-average molecular weight of component (B) is at least 900. On the other hand, for the epoxy-resin composition to exhibit high heat tolerance, the number-average molecular weight of component (B) is preferred to be no greater than 1300, more preferably no greater than 1000. Namely, the number-average molecular weight of component (B) is preferred to be at least 600 but no greater than 1300, more preferably at least 900 but no greater than 1000.

In the embodiments of the present invention, "fracture toughness of a cured product of the epoxy-resin composition" indicates the value of fracture toughness "$G_{Ic}$" (critical energy release rate) obtained by employing an SENB method described in ASTM D5045.

Examples of a commercially available bisphenol bifunctional epoxy resin preferred to be used as component (B) in the embodiments of the present invention are bisphenol A epoxy resins jER1001, jER1002 (brand names, made by Mitsubishi Chemical Corporation), and the like.

As for component (B) contained in the epoxy-resin composition of the embodiment, it is necessary to be a bifunctional epoxy resin. When a bifunctional epoxy resin is used, a cured product of the epoxy-resin composition containing such an epoxy resin exhibits higher fracture toughness than when a trifunctional epoxy resin or higher is used, for example, and the cured product exhibits higher heat tolerance than when a monofunctional epoxy resin is used.

The content of component (B) is preferred to be 8~99 parts by mass based on total 100 parts by mass of all the epoxy resins in the epoxy-resin composition. Namely, the content of component (B) in an epoxy-resin composition is preferred to be 8~99 mass % of the total mass of the epoxy resins in the epoxy-resin composition.

Especially, when an epoxy-resin composition contains only components (A) and (B) as its epoxy resins, the content of component (B) is set so that the content of component (A) will be within the above range. For example, when the content of component (A) is 1~45 parts by mass based on total 100 parts by mass of all the epoxy resins in the epoxy-resin composition, the content of component (B) is preferred to be 55~99 parts by mass. Namely, when the epoxy-resin component in an epoxy-resin composition is made up only of components (A) and (B), the proportions of components (A) and (B) are preferred to be set 1~45 mass % for component (A) and 55~99 mass % for component (B), based on the total mass of components (A) and (B) in the epoxy-resin composition.

When the epoxy-resin composition further contains another epoxy resin such as later-described component (C), the content of component (B) is preferred to be at least 8 parts by mass but no greater than 50 parts by mass. Setting the content of component (B) to be at least 8 parts by mass is preferred since a cured product of the epoxy-resin composition exhibits even higher fracture toughness, and the processability of a prepreg containing the epoxy resin composition is even better. On the other hand, setting the content to be no greater than 50 parts by mass is preferred since it is easier to produce a molded product with even higher heat tolerance, greater strength derived from high elastic modulus, and without voids. The content of component (B) is especially preferred to be 40~46 parts by mass. Namely, when an epoxy-resin composition further contains component (C), the content of component (B) in the epoxy-resin composition is preferred to be 8~50 mass %, more preferably 40~46 mass %, based on the total mass of the epoxy resins in the epoxy-resin composition.

(Component (C): Epoxy Resin in a Liquid State at 30° C.)

The epoxy-resin composition according to an embodiment of the present invention is preferred to further contain component (C) for viscosity adjustment of the composition. Component (C) is an epoxy resin in a liquid state at 30° C., and is preferred not to have an oxazolidone-ring structure in the molecule and to have a viscosity of 1000 Pa·s or lower at 30° C. The molecular weight of component (C) depends on the structure of component (C). When it is a bisphenol bifunctional epoxy resin, the molecular weight is preferred to be less than 600, more preferably 500 or lower. Also, the lower limit of the molecular weight of component (C) is preferred to be at least 200 if it is a bisphenol bifunctional epoxy resin.

The viscosity of component (C) at 30° C. is measured by applying heat on component (C) at a frequency of 1 Hz and a programmed rate of temperature rise of 2° C./min using a rheometer (rotary dynamic viscoelasticity measuring device) such as DSR-200 (made by Rheometrics, Inc.)

In addition, even when the viscosity of component (C) is outside the range set in the present application, if a corrected value at 30° C. is within the range, such a value is also included in the present application.

Examples of the aforementioned epoxy resin are bisphenol A epoxy resins, bisphenol F epoxy resins, biphenyl epoxy resins, dicyclopentadiene epoxy resins, phenol novolac epoxy resins, cresol novolac epoxy resins, tetraglycidyl diamine epoxy resins, glycidyl phenyl ether epoxy resins, and the like. In addition, epoxy resins obtained by modifying those epoxy resins with rubber, urethane or the like, brominated epoxy resins obtained by brominating those epoxy resins and so on are also included. However, those are not the only options, and two or more epoxy resins may be combined.

Component (C) is more preferred to be a bisphenol bifunctional epoxy resin because a cured product of the epoxy-resin composition exhibits high heat tolerance, and because when heat is applied to a curing temperature in a molding process, an acute elevation of viscosity will not occur in the epoxy resin composition and voids are thereby prevented in a molded product.

The content of component (C) is set in such a way that the contents of components (A) and (B) are within the aforementioned respective ranges, but the content is preferred to be at least 20 parts by mass but no greater than 60 parts by mass based on total 100 parts by mass of all the epoxy resins in the epoxy-resin composition.

When the content of component (C) is at least 20 parts by mass, a molded product having fewer voids is obtained by using the epoxy-resin composition containing component (C). On the other hand, the content is preferred to be no greater than 60 parts by mass from the viewpoints of processability of a prepreg containing the epoxy-resin composition and fracture toughness of a cured product of the epoxy-resin composition. The content is especially preferred to be 45~50 parts by mass. Namely, the content of component (C) is preferred to be 20~60 mass %, more preferably 45~50 mass %, of the total mass of all the epoxy resins in an epoxy-resin composition.

(Component (D): Triblock Copolymer)

The triblock copolymer used as component (D) in an embodiment of the present invention indicates a triblock copolymer having a structure where a polymer designated to be a hard segment is connected to both ends of a polymer designated to be a soft segment. The "soft segment" has a high Tg relative to that of the "hard segment." Also, "both ends of a polymer" indicate the end portions of the longest straight chain among the molecular chains of the polymer.

Specific examples of the above triblock copolymer are a triblock copolymer of poly(methyl methacrylate)/poly(butyl acrylate)/poly(methyl methacrylate); a triblock copolymer of poly(styrene)/poly(butadiene)/poly(methyl methacrylate); and the like. Namely, examples are a triblock copolymer where poly(methyl methacrylate), poly(butyl acrylate) and poly(methyl methacrylate) are copolymerized in that order, and a triblock copolymer where poly(styrene), poly(butadiene), and poly(methyl methacrylate) are copolymerized in that order.

A triblock copolymer is microdispersed in an epoxy resin when a polymer that is incompatible with epoxy resins is selected for the central soft segment and a polymer that is compatible with epoxy resins is selected for either or both of the hard segments. The polymer for a soft segment has a lower glass-transition temperature and higher fracture toughness than the polymer for a hard segment. Thus, by microdispersing a triblock copolymer with such a structure in the epoxy resin, heat tolerance of a cured product of the epoxy-resin composition is suppressed from lowering and its fracture toughness is improved.

At both of its ends, a triblock copolymer of poly(methyl methacrylate)/poly(butyl acrylate)/poly(methyl methacrylate) has a hard segment made of a polymer compatible with epoxy resins, and it disperses well in epoxy resins. Thus, such a triblock copolymer is preferred since the fracture toughness of a cured product of the epoxy-resin composition is significantly improved. Examples of a commercially available triblock copolymer of poly(methyl methacrylate)/poly(butyl acrylate)/poly(methyl methacrylate) are Nanostrength® M52, M52N, M22 and M22N (brand names, made by ARKEMA, Inc.)

In addition, as component (D), a triblock copolymer may further contain dimethylacrylamide as a monomer for a material to form the soft segment and/or the hard segment. A triblock copolymer which is further copolymerized with dimethylacrylamide is preferred since such a triblock copolymer contributes excellent fracture toughness to cured products of the epoxy-resin composition. Among commercially available triblock copolymers of poly(methyl methacrylate)/poly(butyl acrylate)/poly(methyl methacrylate), examples of the aforementioned triblock copolymer are Nanostrength® M52N and M22N (brand names, made by ARKEMA).

When component (D) is a triblock copolymer further copolymerized with dimethylacrylamide, the copolymerization proportion of dimethylacrylamide in the triblock copolymer is preferred to be 10~15 mass % in terms of polymerization material of the total mass of the triblock copolymer copolymerized with dimethylacrylamide, since the fracture toughness of a cured product of the epoxy-resin composition is especially excellent.

Among commercially available triblock copolymers of poly(methyl methacrylate)/poly(butyl acrylate)/poly(methyl methacrylate), an example of such a triblock copolymer mentioned above is Nanostrength® M52N (brand name, made by ARKEMA) or the like.

In addition, examples of commercially available triblock copolymers of poly(styrene)/poly(butadiene)/poly(methyl methacrylate) are Nanostrength® 123, 250, 012, E20, E40 (brand names, made by ARKEMA) and the like.

The content of component (D) in the epoxy-resin composition related to the present invention is preferred to be at least 5 parts by mass based on total 100 parts by mass of all the epoxy resins in the epoxy-resin composition, because a cured product of the epoxy-resin composition exhibits high fracture toughness. The content is preferred to be no more than 11 parts by mass, since the cured product of the epoxy-resin composition exhibits higher flexural strength. It is especially preferred for the content to be 5~9 parts by mass.

(Component (E): Curing Agent)

Component (E) in the epoxy-resin composition in an embodiment of the present invention is used as a curing agent. The curing agent used as component (E) is not limited specifically as long as the effects of the present invention are achieved. For example, dicyandiamide, amine-based curing agents, imidazoles, acid anhydrides, boron chloride amine complexes and the like may be used.

Among those, examples of amine-based curing agents are dicyandiamide, diaminodiphenylsulfone and the like.

Examples of imidazoles are 2-phenyl-4,5-dihydroxymethylimidazole, 2-phenyl-4-methyl-5-hydroxymethylimidazole and the like.

Examples of acid anhydrides are hydrogenated methylnadic acid anhydrides, methylhexahydrophthalic acid anhydrides, and the like.

Especially, using dicyandiamide is preferred because properties of the epoxy-resin composition will not be affected by humidity in the air, the quality of the epoxy-resin composition is kept stable for a long period of time, and the epoxy-resin composition completely cures at a relatively low temperature. Here, "relatively low temperature" indicates temperatures in a range of 100~130° C.

The content of component (E) depends on the type of component (E). For example, when component (E) is dicyandiamide, its content is usually 1~25 parts by mass based on 100 parts by mass of epoxy resins in the epoxy resin composition. More preferably, the molar number of active hydrogen of the dicyandiamide is preferred to be 0.6~1.0 times the total molar number of epoxy groups in the epoxy resins contained in the epoxy-resin composition. A setting of 0.6 times or greater is preferred because a cured product exhibits excellent heat tolerance and mechanical characteristics (namely, high strength). In addition, if it is 1.0 time or less, a cured product having excellent mechanical characteristics is obtained. It is further preferable for the molar number of active hydrogen of dicyandiamide to be 0.6~0.8 times the total molar number of epoxy groups in the epoxy resins contained in the epoxy-resin composition, since heat tolerance is even higher in a cured product of the epoxy-resin composition.

The total molar number of epoxy groups in epoxy resins contained in an epoxy-resin composition is calculated from the amounts that were fed into the composition.

(Component (F): Urea-based Curing Aid)

The epoxy-resin composition of an embodiment of the present invention may contain component (F)—a urea-based curing aid—if necessary. Especially, when dicyandiamide is used as component (E), using both the dicyandiamide and a urea-based curing aid is preferred since the epoxy-resin composition containing them completely cures at a low temperature in a short period of time.

Examples of a urea-based curing aid are urea derivative compounds such as 3-phenyl-1,1-dimethylurea (PDMU), toluene bis dimethyl urea (TBDMU), 3-(3,4-dichlorophenyl)-1,1-dimethylurea (DCMU), and the like. Urea-based curing aids are not limited to those, and may be used alone or in combination of two or more.

Among those, 3-phenyl-1,1-dimethylurea and toluene bis dimethyl urea are especially preferred from the viewpoint of heat tolerance and flexural strength exhibited in a cured product of the epoxy-resin composition.

In addition, using 3-phenyl-1,1-dimethylurea as component (F) is preferred, since a cured product of the epoxy-resin composition containing such component (F) exhibits especially high toughness. On the other hand, using toluene bis dimethyl urea as component (F) is preferred, since the time for curing epoxy resin is even shorter.

It is preferable for the content of component (F) to be 1.2~4 parts by mass based on total 100 parts by mass of all the epoxy resins in the epoxy-resin composition because such a content contributes to producing excellent cured products. Moreover, it is even more preferable for the content to be 1.5~2 parts by mass, since an acute elevation of viscosity will not occur when the epoxy-resin composition is heated to a curing temperature in a molding process, and voids are suppressed in the molded product. In addition, the molded product exhibits high heat tolerance.

(Other Epoxy Resin (Z))

The epoxy-resin composition according to an embodiment of the present invention is preferred to be made of components (A) and (B) only, or components (A), (B) and (C) only. However, the epoxy-resin composition may further contain epoxy resin (Z), which is not any of components (A), (B) and (C).

Examples of such epoxy resin are bifunctional epoxy resins such as bisphenol A epoxy resins, bisphenol F epoxy resins, biphenyl epoxy resins, dicyclopentadiene epoxy resins, and modified epoxy resins of those epoxy resins. Examples of polyfunctional epoxy resins having three or more functional groups are phenol novolac epoxy resins, cresol novolac epoxy resins, glycidylamine epoxy resins such as tetraglycidyl diaminodiphenyl methane, glycidyl phenyl ether epoxy resins such as tetrakis(glycidyloxyphenyl)ethane, and tris(glycidyloxyphenyl)methane, and glycidylamine and glycidylphenyl ether epoxy resins such as triglycidylaminophenol. In addition, examples include modified epoxy resins of those resins, brominated epoxy resins obtained by brominating the above epoxy resins, and the like. However, epoxy resin (Z) is not limited to the above, and two or more of the epoxy resins above may be combined.

(Other Additives)

As an optional component, the epoxy-resin composition according to an embodiment of the present invention may contain one or more additives (hereinafter referred to as "optional additives") selected from among a group of thermoplastic resins other than component (B), elastomers, and thermoplastic elastomers. Such an optional additive works to optimize viscosity, storage elasticity and thixotropic properties of the epoxy-resin composition by modifying the composition's visco-elasticity, and also works to improve the fracture toughness of a cured product of the epoxy-resin composition. Thermoplastic resins, elastomers and thermoplastic elastomers to be used as an optional additive may be used alone or in combination of two or more.

Such an additive as those listed above may be dissolved in epoxy-resin components, or may be contained in the epoxy-resin composition in a state of fine particles, long fiber, short fiber, fabric, nonwoven cloth, mesh, pulp or the like. The optional additive is preferred to be provided on the surface layer of a prepreg in a state of fine particles, long fiber, short fiber, fabric, nonwoven cloth, mesh, pulp or the like, since interlayer delamination is suppressed from occurring in later-described fiber-reinforced plastics produced by laminating the prepreg.

As for thermoplastic resins, it is preferred to use a thermoplastic resin that contains in its main chain at least one type of bonding selected from a group of carbon-carbon bonding, amide bonding, imide bonding, ester bonding, ether bonding, carbonate bonding, urethane bonding, urea bonding, thioether bonding, sulfonic bonding, imidazole bonding and carbonyl bonding. More specific examples are thermoplastic resins that belong to engineering plastics such as polyacrylate, polyamide, polyaramid, polyester, polycarbonate, polyphenylene sulfide, polybenzimidazole, polyimide, polyether imide, polysulfone, and polyether sulfone.

Among those, polyimide, polyetherimide, polysulfone, polyethersulfone and the like are especially preferred because excellent heat tolerance is achieved. Also, those thermoplastic resins are preferred to have functional groups that are reactive with epoxy resins from the viewpoints of enhanced fracture toughness and storage stability in a cured product of the resin composition related to the present invention. Examples of functional groups having favorable reactivity with epoxy resins are carboxyl groups, amino groups and hydroxyl groups.

(Method for Producing Epoxy-Resin Composition)

A method for producing an epoxy-resin composition related to the present invention is not limited specifically, as long as the effects of the present invention are achieved. Any known method may be employed. For example, it is an option to mix simultaneously all the components to form an epoxy-resin composition. Alternatively, it is another option to prepare a masterbatch by mixing part of an epoxy resin to be contained in a composition with component (E) (curing agent) and the like, and to produce an epoxy-resin composition using the masterbatch. Mixers such as a three-roll mill, planetary mixer, kneader, universal mixer, homogenizer, homodispenser, and the like are used in the mixing process.

In an embodiment of the present invention, an epoxy-resin composition may be prepared as follows.

Step (1): prepare a catalytic resin composition by dispersing components (E) and (F) homogeneously into a portion of epoxy resin;

Step (2): prepare a dissolved thermoplastic resin base by feeding epoxy resin (all of components (A) and (B), or all of components (A), (B) (C) and (Z) when components (C) and (Z) are included), component (D) and additives or the like into a dissolution vessel and by heating and mixing at 140~170° C. for 1~6 hours; and Step (3): produce an epoxy-resin composition by cooling the masterbatch prepared in step (2) to 50~70° C., adding the catalytic resin composition prepared in step (1), and mixing them at 50~70° C. for 0.5~2 hours.

Step (3') below may be added between steps (2) and (3). In such a case, part of the epoxy resin is fed in step (2) and the rest is fed in step (3).

Step (3'): prepare a masterbatch by feeding the dissolved thermoplastic resin base and the rest of components (A), (B), (C) and (Z) into a dissolution vessel and by heating and mixing at 70~140° C. for 1~3 hours.

<Film Produced Using Epoxy-Resin Composition>

By coating the epoxy-resin composition of an embodiment of the present invention on a release paper or the like and by curing the coating, a film is obtained from the epoxy resin composition. The film related to the present invention is useful as an intermediate material for producing a prepreg, or as surface-protective film or adhesive film when laminated on a base material and cured thereon.

An aspect of the present invention is to produce a film from the epoxy-resin composition.

As for application examples, it is preferred to coat the epoxy-resin composition related to the present invention on a surface of a base material such as a release paper. The uncured coated layer may be laminated on another base material and cured thereon, or the coated layer itself is cured, so that a film is formed.

<Prepreg and Fiber-Reinforced Plastic>

A prepreg is obtained by impregnating a reinforcing fiber material with the epoxy-resin composition of an embodiment of the present invention.

The reinforcing fiber material to be used for a prepreg related to the present invention may be in a state of tow, cloth or chopped fiber, continuous fibers aligned to have a unidirectional orientation, continuous fibers woven to have vertical and horizontal orientations, tows in a unidirectional alignment and held by a horizontal auxiliary yarn, multiple unidirectional reinforcing fiber sheets laminated in different directions and stitched with an auxiliary yarn so as to form multiaxial warp knit, non-woven reinforcing fibers, and the like.

Among those, preferred states are continuous fibers aligned to have a unidirectional orientation, continuous fibers woven to have vertical and horizontal orientations, tows in a unidirectional alignment and held by a horizontal auxiliary yarn, and multiple unidirectional reinforcing fiber sheets laminated in different directions and stitched with an auxiliary yarn so as to form multiaxial warp knit.

To exhibit strength in a cured product, a state of continuous fibers aligned to have unidirectional orientation is more preferred.

Reinforcing fibers of the reinforcing fiber material are not limited specifically; for example, carbon fibers, graphite fibers, glass fibers, organic fibers, boron fibers, steel fibers and the like may be used. Especially, carbon fibers and graphite fibers are preferred to be used in a prepreg since they have an excellent specific modulus and contribute significantly to produce lightweight molded products that contain such fibers. Also, numerous types of carbon fibers and graphite fibers are available for various uses.

A prepreg related to the present invention is obtained using a known method by impregnating a reinforcing fiber material with the aforementioned epoxy-resin composition of an embodiment of the present invention. For example, a prepreg is produced by the following methods: a predetermined amount of the epoxy-resin composition is coated on a surface of a release paper or the like and a reinforcing fiber material is provided onto the surface, and they are then set to pass through a pressurizing roll so that the epoxy-resin composition is impregnated into the reinforcing fiber material; or a predetermined amount of the epoxy-resin composition is directly coated on a reinforcing fiber material, and the coated reinforcing fiber material is sandwiched by release paper or the like, if necessary, and is passed through a pressurizing roll so that the epoxy-resin composition is impregnated into the reinforcing fiber material.

Namely, another aspect of the present invention is to use the epoxy-resin composition as a prepreg. The prepreg is preferred to contain the epoxy-resin composition and a reinforcing fiber material.

Fiber-reinforced plastics related to the present invention are made of reinforcing fiber and a cured product of the epoxy-resin composition of an embodiment of the present invention described above. Use of fiber-reinforced plastics is not limited specifically; for example, they are used in industrial applications such as aircraft structural material, automobiles, ships, sports equipment, windmills, rolls and the like.

Fiber-reinforced plastics related to the present invention are obtained by molding the aforementioned prepreg according to an embodiment of the present invention. Specific methods are autoclave molding, sheet wrapping, internal-pressurizing molding, pressing and the like. Alternatively, plastics are molded when the epoxy-resin composition is impregnated into filaments or preform of reinforcing fibers and then is cured by using molding methods such as RTM (resin transfer molding), VaRTM (vacuum assisted resin transfer molding), filament winding, RFI (resin film infusion) or the like.

When fiber-reinforced plastics are produced through compression molding conducted on the prepreg related to the present invention, the method is preferred to include steps for heating and compressing the prepreg or a preform made by laminating the prepreg by sandwiching it in a die preheated at a curing temperature. The temperature of the die is preferred to be 120~140° C., and curing time is preferred to be 5~60 minutes.

EXAMPLES

In the following, examples of the present invention are described in detail. However, the present invention is not limited to those examples. The contents of components (A)~(F) shown in Tables 1 and 2 each indicate parts by mass.

<Raw Material>

Component (A)
  component (A-1): a bifunctional epoxy resin having an oxazolidone-ring structure (brand name: AER4152, made by Asahi Kasei E-Materials Corporation)

Component (B)
  component (B-1): a bisphenol A bifunctional epoxy resin (number-average molecular weight of 900, brand name: jER1001, made by Mitsubishi Chemical Corporation)
  component (B-2): a bisphenol A bifunctional epoxy resin (number-average molecular weight of 1200, brand name: jER1002, made by Mitsubishi Chemical)

Component (C)
  component (C-1): a bisphenol A bifunctional epoxy resin (number-average molecular weight of 370, brand name: jER828, made by Mitsubishi Chemical)

Component (D)
  component (D-1): an acrylic block copolymer (a triblock copolymer of poly(methyl methacrylate)/poly(butyl acrylate)/poly(methyl methacrylate), which is further copolymerized with dimethylacrylamide) (brand name: Nanostrength® M52N, made by ARKEMA, Inc.)
  component (D-2): an acrylic block copolymer (a triblock copolymer of poly(methyl methacrylate)/poly(butyl acrylate)/poly(methyl methacrylate), which is further copolymerized with dimethylacrylamide) (brand name: Nanostrength® M22N, made by ARKEMA)
  component (D-3): an acrylic block copolymer (a triblock copolymer of poly(methyl methacrylate)/poly(butyl acrylate)/poly(methyl methacrylate)) (brand name: Nanostrength® M52, made by ARKEMA)
  component (D-4): an acrylic block copolymer (a triblock copolymer of poly(methyl methacrylate)/poly(butyl acrylate)/poly(methyl methacrylate)) (brand name: Nanostrength® M51, made by ARKEMA)

Component (E)
  component (E-1): dicyandiamide (brand name: DICY15, made by Mitsubishi Chemical)
  component (E-2): 4,4-diaminodiphenylsulfone (brand name: Seikacure S, made by Seika Corp.)
Component (F)
  component (F-1): 3-phenyl-1,1-dimethylurea (brand name: Omicure 94, made by Hodogaya Chemical Co., Ltd.)

<Steps for Preparing Catalytic Resin Composition 1 to be used in Examples 1-16, 18-20 and Comparative Example 1>

From the components of epoxy-resin compositions in each example and comparative example shown in table 1 or 2, a portion of component (C-1) (brand name: jER828) was set aside, and component (E-1) (brand name DICY15) was then uniformly dispersed into the portion using a three-roll mill to prepare catalytic resin composition 1.

<Steps for Preparing Catalytic Resin Composition 2 to be used in Example 17>

From the components of the epoxy-resin composition in example 17 shown in table 1, a portion of component (C-1) (brand name: jER828) was divided, and component (E-2) (brand name Seikacure S) was then uniformly dispersed into the portion using a mixer to prepare catalytic resin composition 2.

<Steps for Preparing Epoxy-Resin Composition>

The rest of the components shown in tables 1 and 2, excluding the components used for preparing the catalytic resin composition, were fed into a glass flask, heated and mixed at 150° C. to obtain a homogeneously mixed masterbatch. Next, into the masterbatch that was cooled to 60° C. or lower, catalytic epoxy-resin composition 1 or 2 was measured and added so that the catalytic epoxy-resin composition was heated and mixed at 60° C. and uniformly dispersed in the masterbatch to obtain an epoxy resin composition. The components of each epoxy-resin composition are shown in tables 1 and 2.

<Steps for Preparing Cured Resin Sheet of Epoxy-Resin Composition>

The epoxy-resin composition prepared according to the steps for preparing an epoxy-resin composition above was sandwiched between glass plates using a 2 mm- or 3 mm-thick spacer made of polytetrafluoroethylene. Then, the temperature was raised at a programmed rate of 4° C./min, and the composition was cured by maintaining the temperature at 120° C. for 45 minutes. Accordingly, a cured-resin sheet was obtained.

<Method for Measuring G'-Tg>

The 2 mm-thick cured-resin sheet obtained in the above step for preparing a cured-resin sheet of an epoxy-resin composition, or each fiber-reinforced plastic panel such as that obtained in later-described <examples 6~8, 19 and 20>, was processed into a test piece (55 mm long×12.5 mm wide). Then, using a rheometer (brand name: ARES-RDA, made by TA Instruments), values of log G' obtained were plotted in relation to the temperature under conditions of frequency at 1 Hz and a programmed rate of temperature rise at 5° C./min. Glass transition temperature (G'-Tg) is obtained as the temperature at a point where an approximate straight line in the flat region of log G' intersects with an approximate straight line of the region where G' makes a transition.

<Method for Measuring $G_1$ of Cured Resin Sheet>

Regarding a 3 mm-thick cured-resin sheet obtained in the above step for producing the cured-resin sheet of an epoxy-resin composition, the value of fracture toughness $G_{Ic}$ (critical energy release rate) was measured by employing an SENB method described in ASTM D5045.

<Method for Measuring Flexural Properties of Cured Resin Sheet>

The 2 mm-thick cured resin sheet prepared in the steps for producing a cured-resin sheet of each epoxy-resin composition was processed into a test piece (60 mm long×8 mm wide). Then, flexural properties of each cured-resin sheet were measured by using a universal testing instrument with a 500N load cell (brand name: Instron 4465, made by Instron Corporation). Using a three-point bending tool (load applicator R=3.2 mm, support R=1.6 mm) under conditions of temperature at 23° C. and relative humidity at 50%, flexural strength, flexural modulus, and degree of flexural elongation were measured for each test piece. At that time, distance (L) between supports and thickness (d) of each test piece were set at a ratio (L/d) of 16.

<Method for Measuring Flexural Properties of Fiber-Reinforced Plastic>

Each fiber-reinforced plastic panel obtained in later-described examples 6~8, 19 and 20 was processed into a test piece (130 mm long×12.7 mm wide) in such a way that reinforcing fibers (carbon fiber) have an orientation angle of 0 degree (or 90 degrees) to a long side of the test piece. Then, flexural properties of the fiber-reinforced plastic were measured by using a universal testing instrument (brand name: Instron 4465, made by Instron Corporation). Using a three-point bending tool (load applicator R=5 mm, support R=3.2 mm) under conditions of temperature at 23° C. and relative humidity at 50%, flexural strength, flexural modulus, and degree of elongation under a maximum load were measured for each fiber-reinforced plastic. At that time, distance (L) between supports and thickness (d) of each test piece were set as follows: a ratio (L/d)=40, and a crosshead speed (rate per minute)=$(L^2 \times 0.01)/(6 \times d)$.

<Method for Measuring Interlaminar Shear Strength of Fiber-Reinforced Plastic>

Each fiber-reinforced plastic panel obtained in later-described examples 6~8, 19 and 20 was processed into a test piece (25 mm long×6.3 mm wide) in such a way that reinforcing fibers have an orientation angle of 0 degree to a long side of the test piece. Then, using a universal testing instrument (brand name: Instron 4465, made by Instron), the interlaminar shear strength of the fiber-reinforced plastic was measured. Using a three-point bending tool (load applicator R=3.2 mm, support R=1.6 mm) under conditions of temperature at 23° C. and relative humidity at 50%, the interlaminar shear strength (ILSS) was measured for each fiber-reinforced plastic. At that time, distance (L) between supports and thickness (d) of each test piece were set as follows: a ratio (L/d)=4, and a crosshead speed (rate per minute)=$(L^2 \times 0.01)/(6 \times d)$.

<Method for Observing Occurrence of Void in Fiber-Reinforced Plastic>

Each fiber-reinforced plastic panel obtained in later-described examples 6~8, 19 and 20 was cut by a plane perpendicular to the direction of fiber orientation in reinforcing fibers (carbon fibers), and the cut surface was polished. Then, the polished cut surface was observed by a 75~150-power microscope to see if there were voids present.

Examples 1~5, 9-16, 18, and Comparative Example 1

Following the above preparation steps and production steps, epoxy-resin compositions and cured-resin sheets were each produced to have their respective components as shown in table 1. Then, G'-Tg and $G_{Ic}$ were measured for each example by the methods described above. The results are shown in table 1.

As shown in table 1, it was found that examples 1~5 and 9~18 each showed a high $G_{Ic}$ value of at least 800 J/m², and G'-Tg was 125° C. or higher.

Examples 1~5, 9~16 and 18 each exhibit a cured-resin sheet having high fracture toughness, heat tolerance and strength after being cured at a relatively low temperature in a short time such as at 120° C. for 45 minutes.

By contrast, the cured-resin sheet in comparative example 1 exhibits low heat tolerance and low strength.

Example 17

An epoxy-resin composition with components shown in table 1 and its cured-resin product were prepared the same as in example 1 according to the aforementioned preparation steps and production steps, except that in the steps for producing a cured-resin sheet of the epoxy-resin composition the programmed rate of temperature rise was set at 2° C./min and the composition was cured at 180° C. for 2 hours. Then, G'-Tg and $G_{Ic}$ were measured using the above-described measuring methods.

As shown in table 1, example 17 showed a high $G_{Ic}$ value of at least 1000 J/m² and its G'-Tg was found to be 140° C. or higher.

Examples 6~8, 19 and 20

Epoxy-resin compositions were each obtained the same as in example 1 except for using components shown in Table 2 respectively.

Next, by setting the resin-film weight at such a rate that the resin content of a prepreg formed using two sheets of the film will be 38 mass %, each obtained epoxy-resin composition was coated on a release paper using a film coater under conditions of temperature at 65° C. Accordingly, each resin film was prepared.

On the resin-coated surface of each resin film, carbon fibers (brand name: TR50S, made by Mitsubishi Rayon Co. Ltd.) were wound using a drum winder to form a sheet with a fiber weight of 150 g/m². In addition, another resin film was laminated on the carbon-fiber layer using the drum winder.

The carbon-fiber sheet sandwiched between two resin films was passed through a fusing press under conditions of temperature at 100° C., pressure at 0.4 MPa, and a feed rate at 1 m/min (brand name: JR-600S, made by Asahi Corporation, processing length of 1340 mm, cylinder pressure). Accordingly, a prepreg was obtained to have a fiber weight of 150 g/m² and a resin content of 38 mass %.

Then, 16 sheets of prepreg were laminated and kept in an autoclave oven under conditions of pressure at 0.6 MPa and

TABLE 1

|  |  | example 1 | example 2 | example 3 | example 4 | example 5 | comp. example 1 | example 9 | example 10 |
|---|---|---|---|---|---|---|---|---|---|
| component (A) | (A-1) | 9 | 9 | 9 | 9 | 9 |  | 5 | 18 |
| component (B) | (B-1) | 45 | 45 | 45 | 45 | 45 | 54 | 55 | 42 |
|  | (B-2) |  |  |  |  |  |  |  |  |
| component (C) | (C-1) | 46 | 46 | 46 | 46 | 46 | 46 | 40 | 40 |
| component (D) | (D-1) | 5 | 5 | 5 | 5 | 5 | 5 | 5 | 5 |
|  | (D-2) |  |  |  |  |  |  |  |  |
|  | (D-3) |  |  |  |  |  |  |  |  |
|  | (D-4) |  |  |  |  |  |  |  |  |
| component (E) | (E-1) | 5 | 5 | 5 | 5 | 5 | 5 | 5 | 5 |
|  | (E-2) |  |  |  |  |  |  |  |  |
| component (F) | (F-1) | 4 | 2 | 1.5 | 1.2 | 1.0 | 4 | 1.4 | 1.4 |
| $G_{Ic}$ |  | 2160 | 2080 | 2150 | 1910 | 1770 | 2767 | 1640 | 1430 |
| G'-Tg (° C.) |  | 122 | 129 | 128 | 129 | 129 | 118 | 125 | 130 |
| flexural strength (MPa) |  | 131 | 126 | 131 | 130 | 127 | 123 | 130 | 128 |
| flexural modulus (GPa) |  | 3.0 | 2.8 | 3.0 | 3.0 | 2.8 | 2.9 | 2.9 | 2.8 |
| flexural elongation (%) |  | 6.8 | 7.1 | 7.0 | 7.0 | 7.0 | 6.8 | 7.0 | 7.2 |

|  |  | example 11 | example 12 | example 13 | example 14 | example 15 | example 16 | example 17 | example 18 |
|---|---|---|---|---|---|---|---|---|---|
| component (A) | (A-1) | 25 | 30 | 42 | 18 | 18 | 18 | 18 | 18 |
| component (B) | (B-1) | 35 | 30 | 18 | 42 | 42 | 42 | 42 |  |
|  | (B-2) |  |  |  |  |  |  |  | 42 |
| component (C) | (C-1) | 40 | 40 | 40 | 40 | 40 | 40 | 40 | 40 |
| component (D) | (D-1) | 5 | 5 | 5 |  |  |  | 5 | 5 |
|  | (D-2) |  |  |  | 5 |  |  |  |  |
|  | (D-3) |  |  |  |  | 5 |  |  |  |
|  | (D-4) |  |  |  |  |  | 5 |  |  |
| component (E) | (E-1) | 5 | 5 | 5 | 5 | 5 | 5 |  | 5 |
|  | (E-2) |  |  |  |  |  |  | 25 |  |
| component (F) | (F-1) | 1.4 | 1.4 | 1.4 | 1.4 | 1.4 | 1.4 |  | 1.4 |
| $G_{Ic}$ |  | 1330 | 980 | 880 | 1310 | 1160 | 850 | 1000 | 1850 |
| G'-Tg (° C.) |  | 130 | 133 | 136 | 130 | 128 | 128 | 147 | 129 |
| flexural strength (MPa) |  | 124 | 124 | 124 | 139 | 115 | 131 | 136 | 127 |
| flexural modulus (GPa) |  | 2.8 | 2.7 | 2.7 | 2.9 | 2.6 | 2.9 | 2.85 | 2.92 |
| flexural elongation (%) |  | 7.5 | 7.5 | 7.5 | 7.1 | 7.3 | 7.3 | 7.49 | 7.26 | temperature at 80° C. for 7 minutes after the temperature was raised at a programmed rate of 4° C./min. Then, the temperature was further raised at a programmed rate of 4° C./min to apply heat for curing the prepreg at 120° C. for 33 minutes. Accordingly, each fiber-reinforced plastic panel was obtained.

Then, using the above-described measuring methods, G'-Tg, 0-degree flexural properties, 90-degree flexural properties and interlaminar shear strength (ILSS) were measured. The 0-degree flexural properties were converted to have a (Vf) of 60%.

It was found in examples 6~8, 19 and 20 that each example exhibited excellent processability of the prepreg in the molding process, no voids were observed in the obtained molded product (fiber-reinforced plastic), and heat tolerance and strength were excellent.

TABLE 2

| | | example 6 | example 7 | example 8 | example 19 | example 20 |
|---|---|---|---|---|---|---|
| component (A) | (A-1) | 9 | 9 | 9 | 18 | 27 |
| component (B) | (B-1) | 41 | 45 | 45 | 42 | 36 |
| component (C) | (C-1) | 50 | 46 | 46 | 40 | 37 |
| component (D) | (D-1) | 5 | 5 | 5 | 5 | 5 |
| component (E) | (E-1) | 5 | 5 | 5 | 5 | 5 |
| component (F) | (F-1) | 1.5 | 1.5 | 1.0 | 1.4 | 1.4 |
| processability of prepreg | | good | good | good | good | good |
| void in CFRP | | none | none | none | none | none |
| G'-Tg | (° C.) | 113 | 115 | 109 | 120 | 121 |
| 0-degree flexural properties | flexural strength [MPa] | 2717 | 2726 | — | 2240 | 2375 |
| | flexural modulus [GPa] | 131 | 132 | — | 121 | 121 |
| | elongation under maximum load [%] | 2.4 | 2.5 | — | 2.2 | 2.4 |
| 90-degree flexural properties | flexural strength [MPa] | 152 | 148 | — | 142 | 137 |
| | flexural modulus [GPa] | 7.1 | 6.9 | — | 6.3 | 6.4 |
| | elongation under maximum load [%] | 3.0 | 2.9 | — | 3.2 | 2.8 |
| | ILSS [MPa] | 83 | 85 | — | 81 | 84 |

INDUSTRIAL APPLICABILITY

Using the epoxy-resin composition according to an embodiment of the present invention, molded products (fiber-reinforced plastics) are obtained at lower temperature in shorter production time. In addition, a prepreg containing the epoxy-resin composition achieves both excellent processability at room temperature and suppression of voids in a molded product. Moreover, when the epoxy-resin composition is used as a matrix resin, fiber-reinforced plastics are obtained having excellent mechanical characteristics, especially excellent fracture toughness and heat tolerance.

According to the present invention, reinforced-fiber plastic molded products that exhibit excellent fracture toughness and high heat tolerance are provided at high productivity and high yield for a wide variety of applications, for example, ranging from sports/leisure molded products such as golf club shafts to industrial molded products such as aircraft.

What is claimed is:

1. An epoxy-resin composition, comprising components (A), (B), (C), (D) and (E), wherein
   component (A) is an epoxy resin comprising an oxazolidone-ring structure;
   component (B) is a bisphenol bifunctional epoxy resin with a number-average molecular weight of at least 600 but no more than 1300, which does not comprise an oxazolidone-ring structure;
   component (C) is an epoxy resin in a liquid state at 30° C.;
   component (D) is a triblock copolymer copolymerized with dimethylacrylamide; and
   component (E) is a curing agent;
   wherein, the proportion of the dimethylacrylamide in the triblock copolymer copolymerized with dimethylacrylamide is set at 10 to 15 mass % with respect to the total mass of the triblock copolymer copolymerized with dimethylacrylamide,
   wherein, with respect to the total mass of epoxy resin in the epoxy-resin composition,
   the content of component (A) is set at 3 to 45 mass %,
   the content of component (B) is set at 8 to 55 mass %,
   the content of component (C) is set at 20 to 60 mass %,
   and the total content of components (A), (B) and (C) does not exceed 100 mass %,
   wherein the content of component (D) is 5 to 11 parts by mass based on 100 parts by mass of epoxy resin in the epoxy-resin composition, and
   the content of component (E) is 1 to 25 parts by mass based on 100 parts by mass of epoxy resin in the epoxy-resin composition.

2. The epoxy-resin composition according to claim 1, wherein the content of component (A) in the epoxy resin composition is set at 4 to 30 mass % of the total mass of epoxy resin in the epoxy-resin composition.

3. The epoxy-resin composition according to claim 1, wherein component (D) is a triblock copolymer of poly(methyl methacrylate)/poly(butyl acrylate)/poly(methyl methacrylate).

4. The epoxy-resin composition according to claim 1, wherein component (E) is dicyandiamide.

5. The epoxy-resin composition according to claim 1, further comprising component (F), which is a urea-based curing aid.

6. The epoxy-resin composition according to claim 5, wherein component (F) is 3-phenyl-1,1-dimethylurea or toluene bis dimethyl urea.

7. The epoxy-resin composition according to claim 1, wherein component (B) is a bisphenol A epoxy resin.

8. The epoxy-resin composition according to claim 1, wherein component (C) does not comprise an oxazolidone-ring structure and its viscosity at 30° C. is 1000 Pa·s or lower.

9. The epoxy-resin composition according to claim 1, wherein component (C) is a bisphenol bifunctional epoxy resin.

10. The epoxy-resin composition according to claim 1, wherein with respect to the total mass of epoxy resin in the epoxy-resin composition,
    the content of component (B) is set at 8 to 50 mass %.

11. A film comprising the epoxy-resin composition according to claim 1.

12. A prepreg made by impregnating a reinforcing fiber material with the epoxy-resin composition according to claim 1.

13. A fiber-reinforced plastic comprising reinforcing fiber and a cured product of the epoxy-resin composition according to claim 1.

14. The epoxy-resin composition according to claim 1, wherein component (E) is dicyandiamide, the content of component (E) in the epoxy-resin composition is set so that the molar number of active hydrogens in dicyandiamide is set at 0.6 to 1.0 times the molar number of the epoxy groups of the epoxy resin in the epoxy-resin composition.

15. The epoxy-resin composition according to claim 1, wherein with respect to the total mass of epoxy resin in the epoxy-resin composition, the content of component (C) is set at 45 to 50 mass %.

16. The epoxy-resin composition according to claim 1, wherein the content of component (D) is 5 to 9 parts by mass based on 100 parts by mass of epoxy resin in the epoxy-resin composition.

17. The epoxy-resin composition according to claim 1, wherein a number-average molecular weight of component (C) is less than 600.

* * * * *